United States Patent [19]
Rice, Sr.

[11] 4,048,565
[45] Sept. 13, 1977

[54] LOCATION INDICATING DEVICE

[75] Inventor: Loyal E. Rice, Sr., Fresno, Calif.

[73] Assignee: The Raymond Lee Organization, Inc., New York, N.Y.; a part interest

[21] Appl. No.: 697,130

[22] Filed: June 17, 1976

[51] Int. Cl.² ............................................. H04B 1/02
[52] U.S. Cl. ................................. 325/114; 325/115
[58] Field of Search ............... 325/111, 114, 115, 116, 325/112; 343/705

[56] References Cited
U.S. PATENT DOCUMENTS

| | | | |
|---|---|---|---|
| 2,473,050 | 6/1949 | Camp | 325/114 |
| 2,831,697 | 4/1958 | Bayze | 325/112 |
| 3,676,779 | 7/1972 | Faulring et al. | 325/115 |

*Primary Examiner*—Robert L. Griffin
*Assistant Examiner*—Marc E. Bookbinder

*Attorney, Agent, or Firm*—Daniel Jay Tick

[57] ABSTRACT

A container mounted on a balloon is borne aloft by the balloon when the balloon is inflated. Compressed gas is provided in the container. A trigger device couples the container to the balloon and is affixed to the cover of a compartment of a craft for supplying the gas to the balloon to inflate it when the cover is opened. A radio transmitter in the container transmits distress signals. A light device in the container produces intermittent flashes of light. A switch device connected to the transmitter, light device and the cover of the compartment activates the transmitter and the light device when the cover is opened. A line wound in the compartment has a first end affixed to the craft and a second end affixed to the container for tethering the balloon when it is airborne.

1 Claim, 3 Drawing Figures

LOCATION INDICATING DEVICE

BACKGROUND OF THE INVENTION

The present invention relates to a location indicating device. More particularly, the invention relates to a location indicating device for indicating the location of a craft in need of assistance.

Objects of the invention are to provide a location indicating device of simple structure, which is inexpensive in manufacture, functions efficiently, effectively and reliably to indicate the location of a craft in need of assistance such as, for example, a downed aircraft, a grounded seagoing craft, or the like.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figures 1, 2, 3:
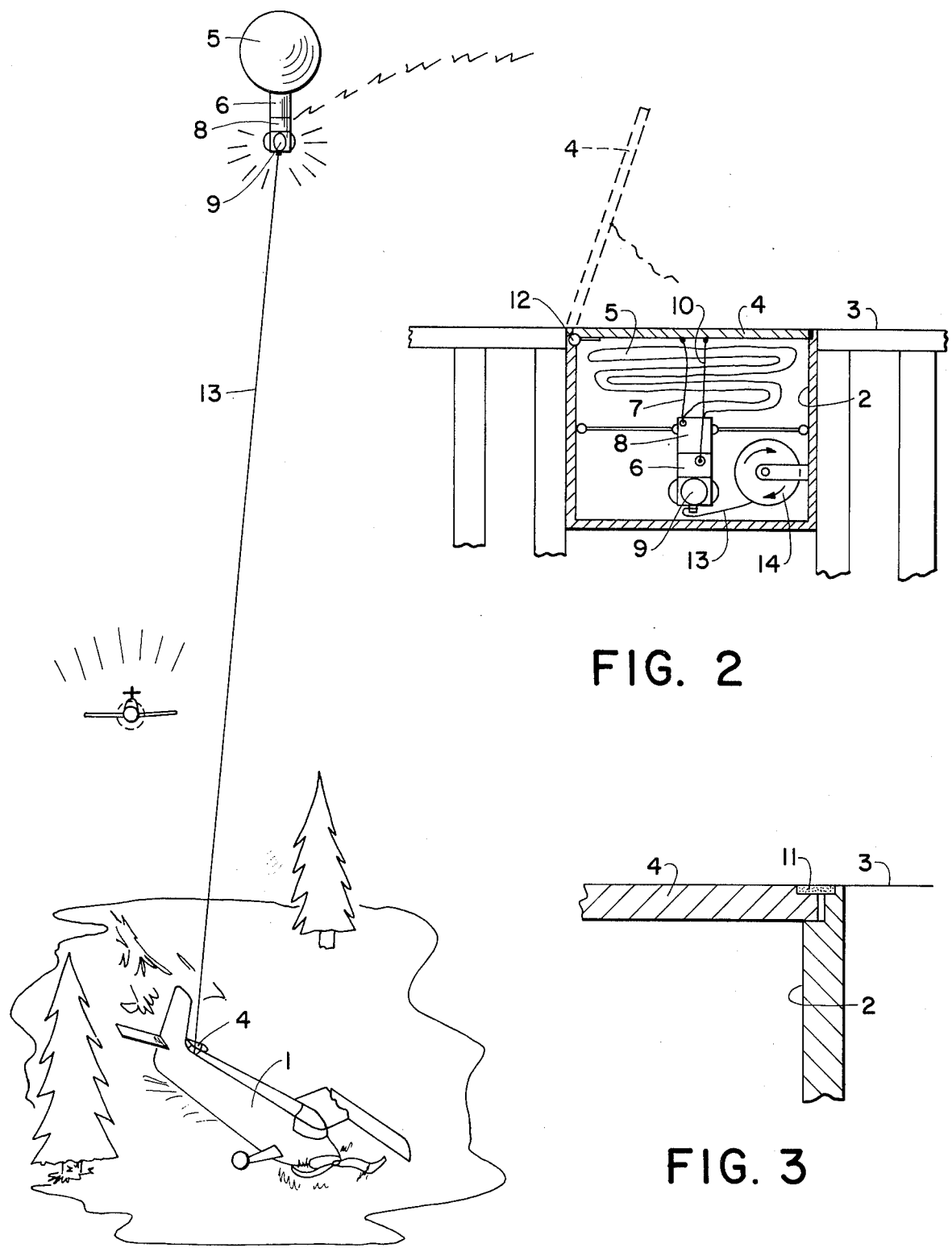
FIG. 1 is a view of an embodiment of the location indicating device of the invention in use.
FIG. 2 is a view, partly in section, on an enlarged scale, of an embodiment of the location indicating device of the invention in its stored condition.
FIG. 3 is a cross-sectional view, on an enlarged scale, illustrating the release device for releasing the location indicating device of the invention from its stored condition.

The location indicating device of the invention is for indicating the location of a craft such as, for example, an aircraft 1 (FIG. 1) in need of assistance. The craft 1 has a compartment 2 therein opening on the outside surface 3 of said craft (FIGS. 2 and 3). A cover 4 on the compartment 2 realeasably covers the opening of the compartment and is adapted to open when the craft 1 suffers an impact.

The location indicating device of the invention comprises a balloon 5 (FIGS. 1 and 2). A container 6 is mounted on the balloon (FIGS. 1 and 2) and is borne aloft by the balloon when the balloon is inflated.

Compressed gas such as, for example, helium, is provided in the container 6. A trigger device 7 (FIG. 2) couples the container 6 to the balloon and is affixed to the cover 4 of the compartment for supplying the gas to the balloon when the cover is opened. The trigger device may comprise any suitable valve operated by a lanyard coupling the valve to the cover 4.

A radio transmitter 8 of any suitable known type is provided in the container 6 for transmitting distress signals (FIGS. 1 and 2).

A light device 9 is provided in the container 6 (FIGS. 1 and 2) for producing intermittent flashes of light. The light device preferably produces blue flashes, since these are more readily visually observable, and may comprise any suitable means for producing intermittent flashes of light.

A switch device 10 (FIG. 2) is connected to the transmitter 8, the light device and the cover 4 of the compartment 2 and functions to activate the transmitter and the light device when the cover is opened. The switch device 10 comprises any suitable ON-OFF switches for the transmitter 8 and the light device and a lanyard coupling said switches to the cover 4.

The cover 4 is maintained in closed position by a seal 11 (FIG. 3) which keeps it closed as long as the craft operates in a normal manner. However, if the craft suffers an impact due to an emergency situation, the seal 11 is automatically broken and the cover 4 is automatically opened by a spring hinge 12 (FIG. 2).

A line 13 (FIGS. 1 and 2) is wound in the compartment 2, perferably on a reel 14, and has a first end affixed to the craft, via said reel, and a second end affixed to the container 6 for tethering the balloon 5 when it is airborne.

While the invention has been described by means of a specific example and in a specific embodiment, I do not wish to be limited thereto, for obvious modifications will occur to those skilled in the art without departing from the spirit and scope of the invention.

I claim:

1. A location indicating device for indicating the location of a craft in need of assistance, said craft having a compartment therein and opening on the outside of the craft and a cover on the compartment releasably covering the opening of the compartment and adapted to open when the craft suffers an impact, said location indicating device comprising a balloon;

a container mounted on the balloon and borne aloft by the balloon when the balloon is inflated;

compressed gas in the container;

trigger means coupling the container to the balloon and affixed to the cover of the compartment for supplying the gas to the balloon to inflate it when the cover is opened, said trigger means comprising a valve operated by a lanyard coupling the valve to the cover;

radio transmitter means in the container for transmitting distress signals;

light means in the container for producing intermittent blue flashes of light;

switch means connected to the transmitter means, light means and to cover of the compartment for activating said transmitter means and said light means when the cover is opened, said switch means comprising ON-OFF switches for the transmitter means and light means and a lanyard coupling said switches to the cover; and a line wound in the compartment and having a first end affixed to the craft and a second end affixed to the container for tethering the balloon when it is airborne.

* * * * *